US009728021B2

(12) United States Patent
Moses et al.

(10) Patent No.: US 9,728,021 B2
(45) Date of Patent: Aug. 8, 2017

(54) SYSTEM AND METHOD FOR AUTO-CONFIGURATION OF DEVICES IN BIM USING BLUETOOTH LOW ENERGY DEVICES

(71) Applicant: Honeywell International Inc., Morristown, NJ (US)

(72) Inventors: Satheesh Babu Moses, Tamilnadu (IN); Viswanathan Chatapuram Krishnan, Tamilnadu (IN); Dharmalingam Vediappan, Tamilnadu (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 61 days.

(21) Appl. No.: 14/487,272

(22) Filed: Sep. 16, 2014

(65) Prior Publication Data

US 2016/0078698 A1    Mar. 17, 2016

(51) Int. Cl.
| | |
|---|---|
| *G05B 19/00* | (2006.01) |
| *G07C 9/00* | (2006.01) |
| *G08B 13/00* | (2006.01) |
| *G06K 7/10* | (2006.01) |
| *G08B 25/14* | (2006.01) |

(52) U.S. Cl.
CPC ..... *G07C 9/00103* (2013.01); *G06K 7/10366* (2013.01); *G08B 13/00* (2013.01); *G08B 25/14* (2013.01)

(58) Field of Classification Search
CPC .... G07C 9/00103; G08B 13/00; G08B 25/14; G06K 7/10366
USPC ...................................................... 340/5.23
See application file for complete search history.

(56) References Cited

U.S. PATENT DOCUMENTS

| | | | |
|---|---|---|---|
| 8,941,485 B1* | 1/2015 | Mendelson | .......... G01C 21/206 |
| | | | 340/539.11 |
| 9,204,257 B1* | 12/2015 | Mendelson | .............. G08G 1/14 |
| 2004/0192349 A1* | 9/2004 | Reilly | .................... G01C 21/20 |
| | | | 455/456.2 |

(Continued)

FOREIGN PATENT DOCUMENTS

WO    2013/123672 A1    8/2013

OTHER PUBLICATIONS

Extended European search report from corresponding EP patent application 15185147.4, dated Dec. 18, 2015.

*Primary Examiner* — Hai Phan
*Assistant Examiner* — Zhen Y Wu
(74) *Attorney, Agent, or Firm* — Husch Blackwell LLP

(57) ABSTRACT

A system that includes a building information model (BIM) defined by a set of geographic coordinates of a secured area embodied in a memory, a plurality of security devices located within the secured area where each of the plurality of security devices has a short range wireless transceiver and a portable user device having a wireless transceiver, a global positioning system (GPS) and a programmed processor that interrogates the short range wireless transceiver of each of the plurality of security devices for identification and functional information of the security device as a user of the portable user device traverses the secured area and saves the identification and functional information along with geographic coordinates of each of the plurality of security devices under the BIM into a memory.

19 Claims, 5 Drawing Sheets

(56) References Cited

U.S. PATENT DOCUMENTS

| | | | |
|---|---|---|---|
| 2009/0303130 A1* | 12/2009 | Kanterakis | G01S 5/0289 |
| | | | 342/387 |
| 2011/0133884 A1 | 6/2011 | Kumar et al. | |
| 2011/0282901 A1 | 11/2011 | Marks et al. | |
| 2013/0054033 A1* | 2/2013 | Casilli | H04L 12/282 |
| | | | 700/276 |
| 2013/0141239 A1 | 6/2013 | Petricoin, Jr. | |
| 2013/0182103 A1 | 7/2013 | Lee et al. | |
| 2014/0039685 A1* | 2/2014 | Blount | G05B 15/02 |
| | | | 700/276 |
| 2014/0143695 A1 | 5/2014 | Sundermeyer et al. | |
| 2014/0218164 A1 | 8/2014 | Mahapatra et al. | |
| 2014/0266687 A1* | 9/2014 | Britton | G08B 25/003 |
| | | | 340/539.1 |
| 2014/0279600 A1* | 9/2014 | Chait | G06Q 30/018 |
| | | | 705/317 |
| 2015/0228181 A1* | 8/2015 | Himmelmann | G08B 21/245 |
| | | | 340/573.1 |
| 2015/0278829 A1* | 10/2015 | Lu | H04W 64/00 |
| | | | 705/7.29 |

\* cited by examiner

SYSTEM AND METHOD FOR AUTO-CONFIGURATION OF DEVICES IN BIM USING BLUETOOTH LOW ENERGY DEVICES

FIELD

This application relates to security systems and more particular to the configuring of security systems.

BACKGROUND

Systems are known to protect people and assets within secured areas. Such systems are typically based upon the use of one more sensors that detect threats within the secured area.

Threats to people and assets may originate from any of a number of different sources. For example, a fire may kill or injure occupants who become trapped by a fire in a home. Similarly, carbon monoxide from a fire may kill people in their sleep.

Alternatively, an unauthorized intruder, such as a burglar may present a threat to assets within a secured area. Intruders have also been known to injure or kill people living within the area.

Fires or carbon monoxide may be detected via detectors placed throughout the area. Similarly, intruders may be detected via switches placed on the doors or windows of a home or business. Alternatively, the area may be monitored via a number of security cameras.

In the case of intruders, sensors may be placed in different areas based upon different uses of the secured space. For example, if people are present within some portions of a normal day and not at other times, then some sensors may be placed along a periphery of the space to provide protection while the space is occupied while additional sensors may be used within the space when the space is not occupied.

In most cases, threat detectors are connected to a local control panel. In the event of a threat detected via one of the sensors, the control panel may sound a local audible alarm. The control panel may also send a signal to a central monitoring station.

While security system work well, they are sometimes difficult to set up and use, especially when large numbers of sensors are involved. Accordingly, a need exists for better methods of expediting such processes.

DETAILED DESCRIPTION

Figure 1:
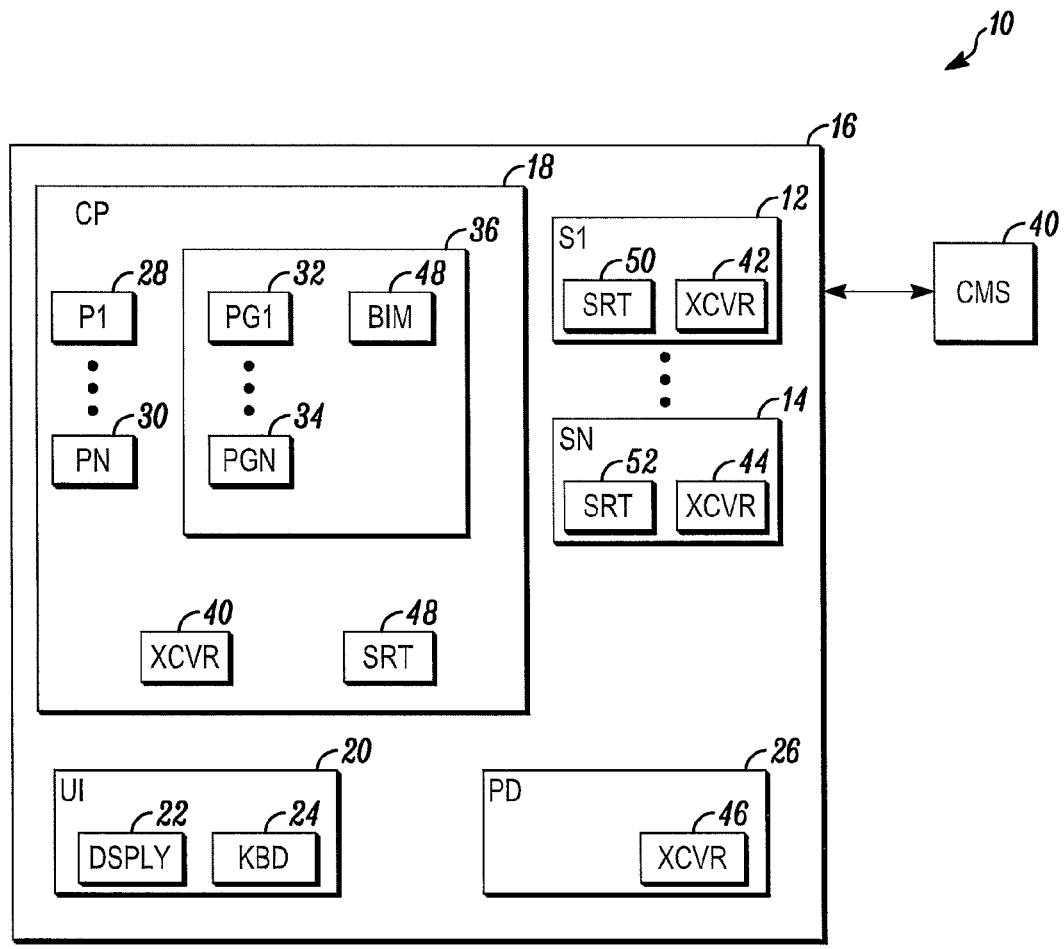
FIG. 1 illustrates a block diagram of a system in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

FIG. 1 is a block diagram of a security system 10 shown generally in accordance with an illustrated embodiment. Included within the security system may be a number of sensors 12, 14 that detect threats within a secured area 16.

The sensors may be based upon any of a number of different threat detection scenarios. For example, some of the sensors may be environmental detectors (e.g., smoke, fire, carbon monoxide, etc.).

Alternatively, some other of the sensor may be intrusion detectors. These sensors may be embodied as limit switches placed on the doors and/or windows allowing access into or egress from the secured area. Alternatively, the sensors may include one or more passive infrared (PIR) detectors that may be placed within the secured area and intended to detect intruders who have been able to defeat the perimeter sensors.

The sensors may also include one or more closed circuit television (CCTV) cameras. The cameras may include processing capabilities that detect motion by comparing successive video frames to detect differences caused by a moving object or person.

The sensors may also include one or more card readers. The card readers may be placed near a door providing entry into the secured area. The card reader may also control an electric lock on the door that may be activated in response to a valid access card being presented to the card reader.

The sensors may be monitored for activation by a control panel 18. The control panel may be located within the secured area (as shown in FIG. 1) or located remote from the secured area.

The security system may be controlled and monitored via a user interface 20. A human user (e.g., a guard) may monitor images from the cameras via a display 22 and select the camera to view through the display via a keyboard 24.

A portable user device (e.g., an iPhone, Android device, etc.) 26 may also be operable within the security system. The portable device has its own display and keyboard.

Also located within the control panel, the sensors and portable user device may be a number of processor apparatus (processors) 28, 30, each operating under control of one or more computer programs 32, 34 loaded from a non-transient computer readable medium (memory) 36. As used herein, reference to a step performed by a computer program is also reference to the processor that executed that step.

The control panel and each of the sensors may be interconnected via a respective wireless transceiver 40, 42, 44. The user interface may be coupled to the control panel directly or via its own wireless transceiver.

The security system may be set to an ARMED, ARMED AWAY or DISARM mode via entry of a personal identification number (PIN) and by activation of a function key through the user interface. Once armed, an alarm processor may monitor each of the sensors for activation. Upon activation of one of the sensors, the alarm processor may compose and send an alarm message to the central monitoring station 40. The alarm message may include an identifier of the alarm system (e.g., account number, address, etc.), an identifier of the type of alarm, a location of the alarm within the secured area and a time. The central monitoring station may respond by sending the appropriate help (e.g., police, fire department, etc.) based upon the type of alarm.

The security system may be set up for proper operation via the portable device 26. In order to facilitate this process, each of the security devices (e.g., the control panel, the sensors, etc.) may be provided with a short range wireless transmitter or transceiver 48, 50, 52. (As used herein, the short range transmitter and transceiver are referred to herein as a short range transceiver.) The short range transceiver can be either a passive device (e.g., an RFID tag) or an active device (e.g., iBeacon) operating under the Bluetooth Low Energy (BLE) technology (e.g., Bluetooth Smart). The short range transceiver may be mechanically attached to the security device during manufacture.

Each short range transceiver may have its own unique identification number and/or information related to the security device to which it is attached (e.g., functional information). Alternatively, the identification number may be cross-referenced to the security device to which it is attached. The functional or cross-referenced information may include a type of device, a model number, a software revision code, and or a unique system identifier of the security device.

The portable device uses its wireless transceiver 46 to detect the short range transceivers. Once detected, the portable device may retrieve or otherwise interrogate the short range transceiver to recover the functional information of the associated security device.

The portable device also has its own global positioning system (GPS). The portable device may use the GPS to detect its own and the geographical coordinates of an associated security device whenever it detects a short range transceiver.

The use of a separate short range transceiver allows the various elements of the security system to be located before the system is activated. This is useful because the short range transceivers have their own power supply and operate separately from the security device to which they are attached.

Before activation of the security system, a user simply walks through the secured area carrying the portable user device. As the user passes by each of the security devices, the portable device detects each security device, determines its functional information and its geographic location. With the functional and geographic information, each of the devices can be added to a geographic map of the secured area.

Located within the memory of the control panel is a file 58 containing a building information model (BIM) that defines the secured area in terms of the geographical coordinates of the boundaries of the secured area, any buildings within the area and the details of those buildings. The BIM file also contains a 2 or 3 dimensional map of the secured area. In some embodiments, the portable device may include a copy of the BIM file.

Figure 2:
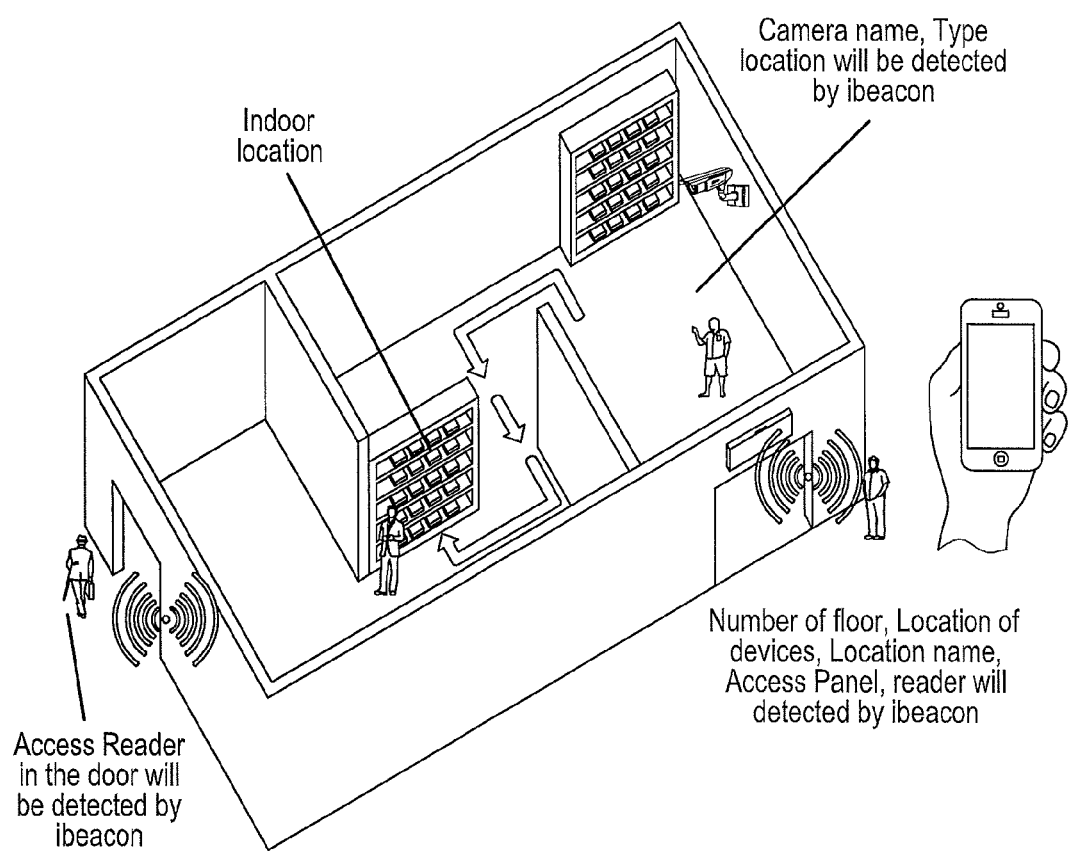
FIG. 2 depicts the use of a portable device in configuring the system of FIG. 1.

In order to set up the security system, the user may activate a set up application within the portable device. The set up application may load the BIM and the user may proceed to walk through the secured area as shown in FIG. 2. As the user walks through the secured area, a security device detection processor scans for the short range transceiver of associated security devices. As each security device is detected, its functional information is determined along with the geographic coordinates of the security device. A matching processor may match the geographic coordinates of each detected security device with a corresponding location within the BIM. Once matched, a map processor may superimpose an icon corresponding to the identified device over the corresponding coordinates on the map of the BIM.

Figure 3:
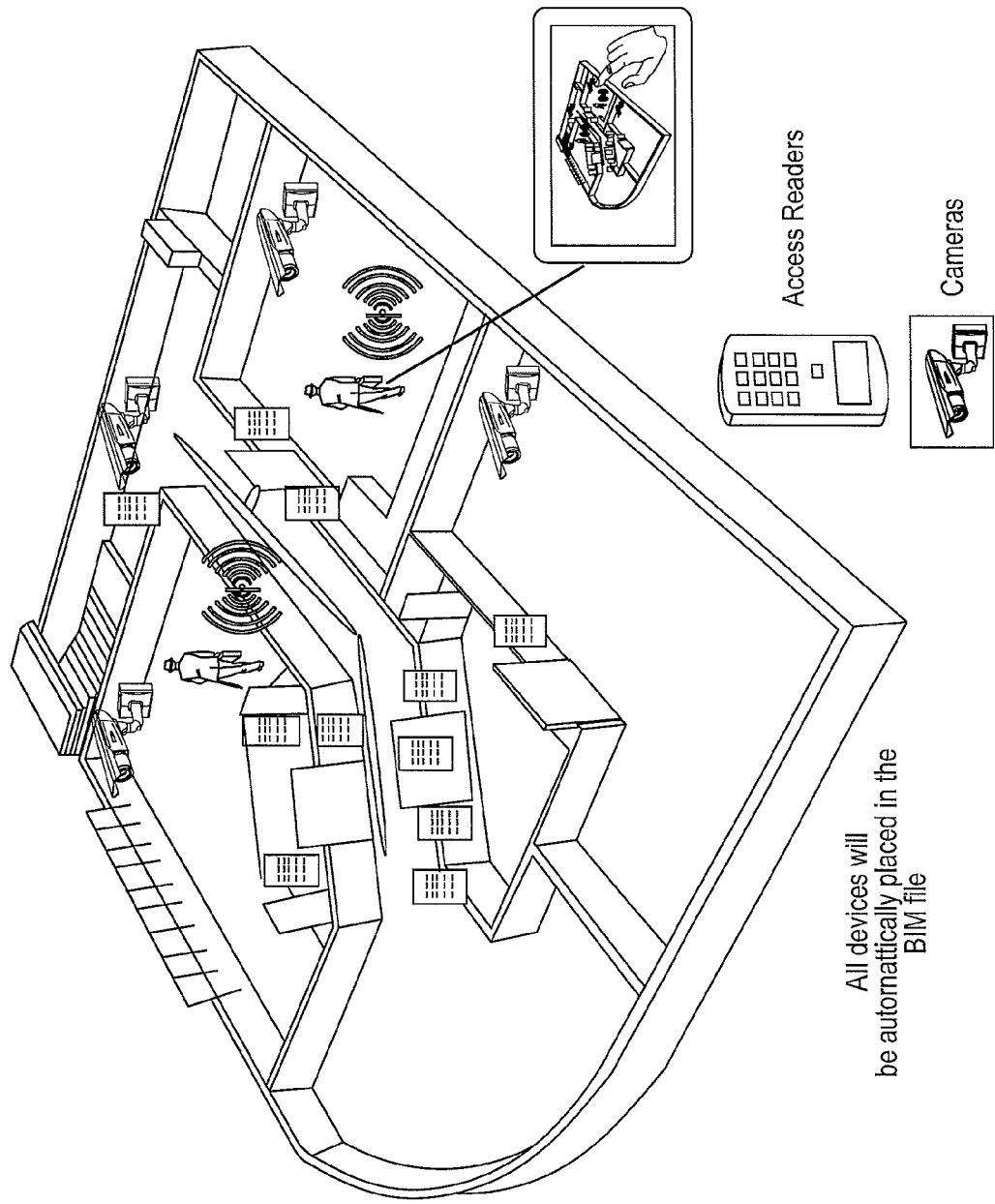
FIG. 3 depicts the use of a portable device to correlate locations between detected security devices and a BIM.

In some cases, the BIM may not include a set of GPS coordinates. In this case, the application may simply prompt the user to provide a location of a detected security sensor on a map shown on the display of the portable device. The user may simply determine his current location on the map, place a cursor over that location and click on that location as shown in FIG. 3.

By clicking on a location of the map, the application correlates the coordinates provided by the GPS with an absolute location on the map. The locations of subsequently detected security devices are simply determined from an offset from the initial location.

Figure 4:
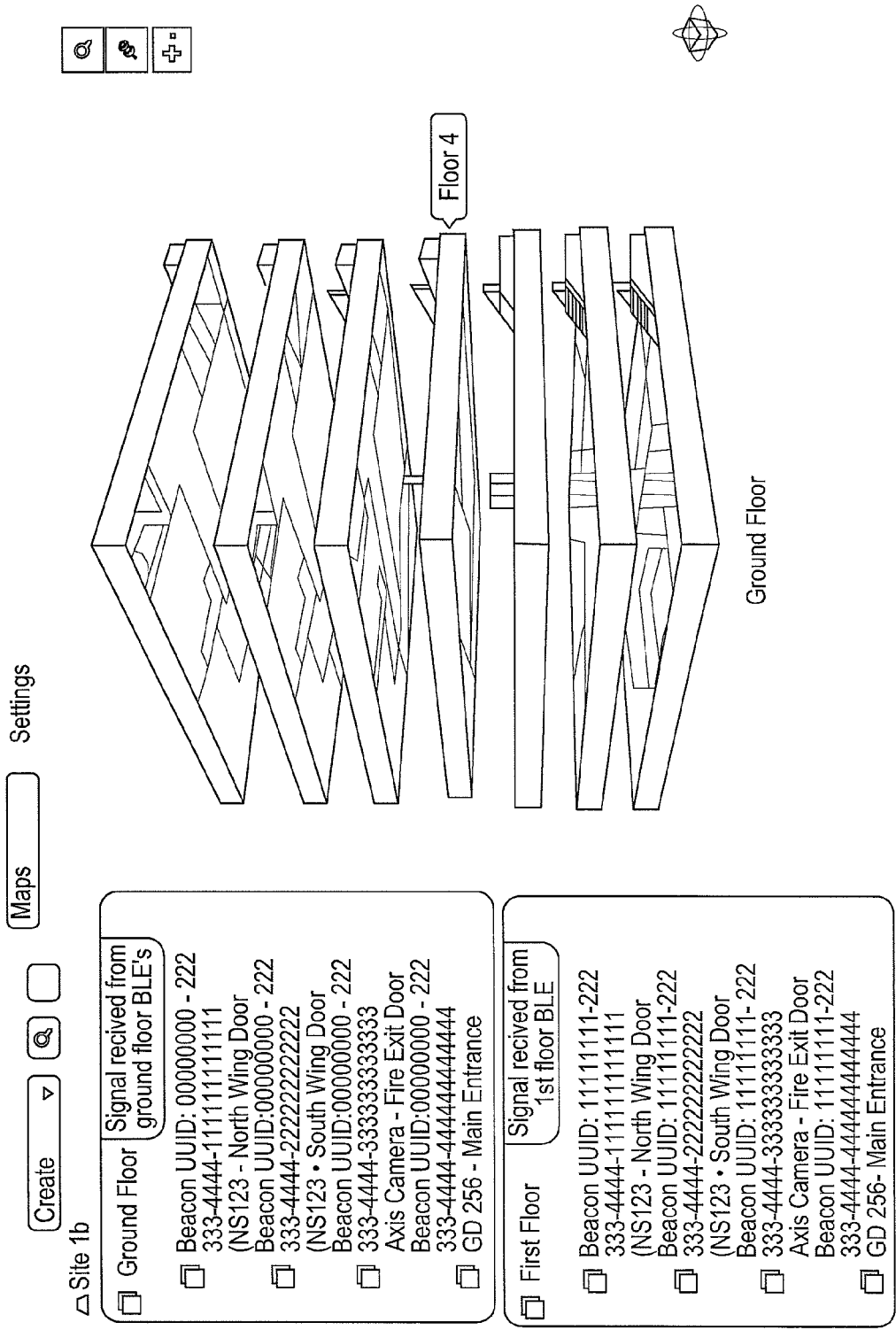
FIG. 4 depicts the use of a portable device without a BIM.

In some cases, the portable device may not include a current version of the BIM. In this case, the portable device may simply detect the short range transceiver at each location and save information from the short range transceiver along with a geographic location of each short range transceiver in a location file as shown in FIG. 4. The user may then activate a communication processor within the portable device that transfers the location file to a corresponding processor within the control panel where the information is used to update the BIM and map within the control panel.

Figure 5:
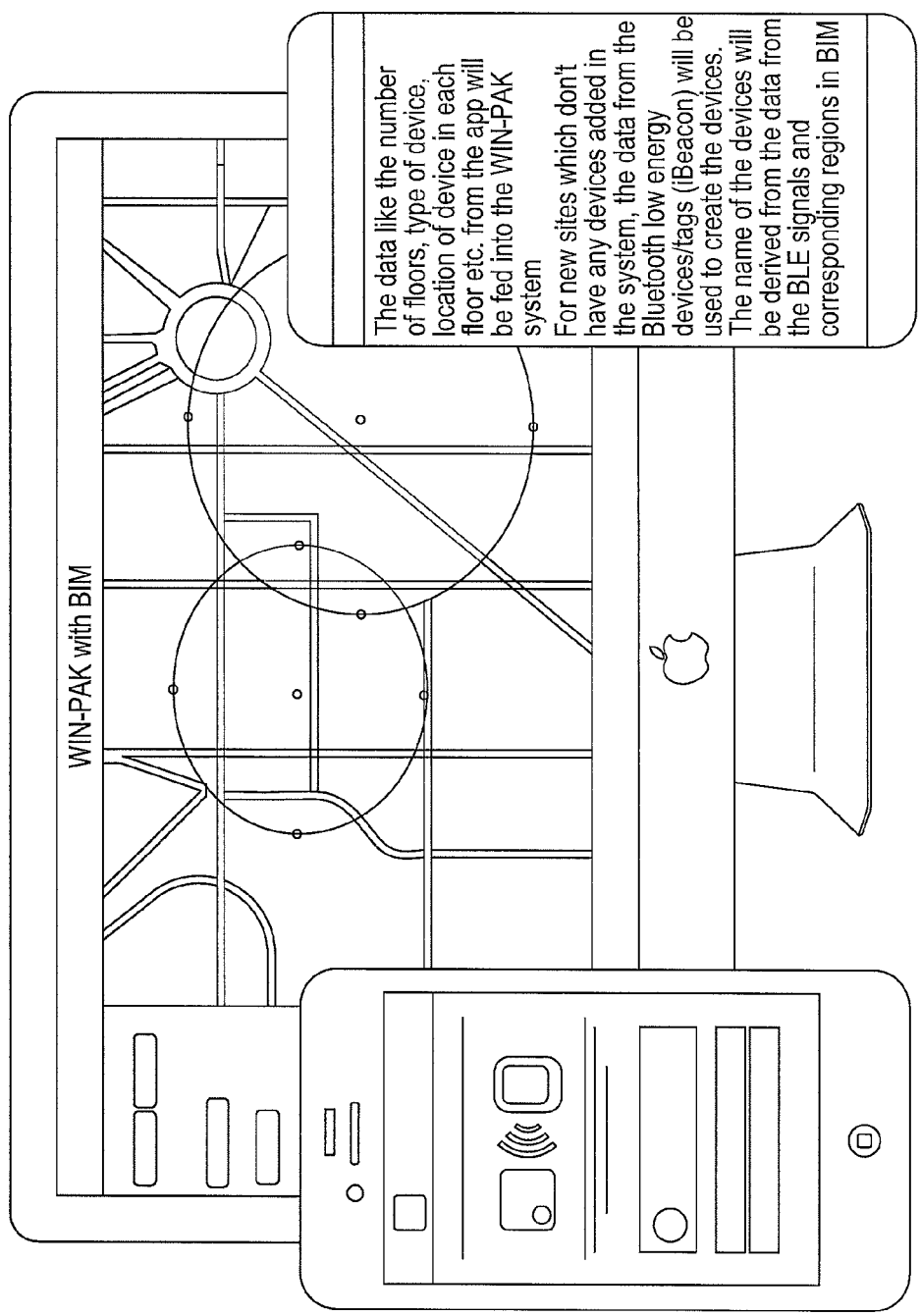
FIG. 5 depicts association of a name with a security sensor.

In another embodiment, once the security devices have been correlated to a location in the BIM, descriptive information from the BIM may be used to add textual names to the security devices as shown in FIG. 5. In this case, the location (e.g., first floor, second floor, etc.) may be retrieved from corresponding locations within the BIM and added to a device identifier (e.g., control panel) of the detected security device.

The system of FIG. 1 differs from conventional systems in a number of regards. For example, conventional security systems do not provide context of the building/site to a user. The information is usually presented as tree views or list views. In other words, the systems are engineer-centric and not end user centric. Building information models help in solving this particular problem by hiding the low level information from the customer and showing only the relevant user context. However configuring the security device within the BIM model presents significant challenges when it comes to synchronizing the floor plan/BIM with the actual security devices. For example, a user has to manually drag and drop the devices into the BIM file or floor plan. In addition, a user has to manually associate the devices with BIM entities. In high rise buildings having large numbers of panels (e.g., 1000 or more), it is very difficult for an operator or user to configure or associate security devices with BIM structures. This problem is applicable to all systems including CCTV, FAS and BMS systems.

In contrast, the system of FIG. 1 incorporates the novel use of short range transceivers based upon Bluetooth. In this regard, Bluetooth low energy devices/tags (e.g., iBeacons) may be attached to access control panels and other access control components as part of the process of the manufacturing/supply chain management systems.

The security devices (e.g., panels) are installed in respective locations under a deployment plan which may consist of a plan spanning multiple floors. The deployment plan is dictated by the needs of the location not upon the convenience of the installers.

The installers of the security system is provided with a setup application in his/her BLE enabled mobile (portable device) which will capture information (coordinates, device type) of all of the panels when the installer walks through the building. The BLE enabled mobile is capable of detecting BLE signals from each of the devices. As the installer walks through the building, the details of the devices are captured in the mobile phone by the application.

Once the installer traverses the entire building the data from the application will be fed into the processing system.

If the operator already has access to the security system through his mobile device, then the devices can be automatically placed into the floor plan/BIM in real time and substantially instantaneously as the user walks through the building.

The data collected by the mobile device is processed to analyze the BLE signals collected by the application. The locations of the devices are compared with the information in the BIM to determine information on the number of floors, type of device on each floor, location of devices on each floor etc. When new security sites are added to the security system software, the data from the BLE devices/tags is used to automatically create the software connections to implement the site into the security system.

In order to confirm the proper recognition of each security device, the user may activate the security system and walk through the secured area a second time carrying the portable device. As the mobile device passes each sensor, the user may manually activate the security device. In this case, a location processor within the control panel and/or portable device may confirm that the control panel receives a signal from the proper security device. The location processor may do this by retrieving the geographical location of any activated sensor from the modified BIM and compare those coordinates with a set of GPS coordinates received from the portable device.

In a system having multiple control panels, the process is a considerable improvement. Based upon information received by the mobile device from the BLE devices, the type and count of panels can be easily obtained. The same number of devices can be automatically added to the system. This results in significant cost savings in operator training and configuration.

The names of the devices can be derived from the combination of data received from the BLE devices and BIM. This can be accomplished by retrieving text descriptions from the BIM and incorporating this text into descriptive text fields of the security devices.

The system offers a number of advantages. For example, the system offers a quicker, intuitive and easier way of configuring security devices. All of the security devices can be added along with some meaningful name and is automatically placed into the BIM in significantly less time. The errors associated with manual configuration are avoided. This process enhances the human factor and enriches the user experience by automating the configuration process. The system provides an improved context in presentation of the devices on a map of the BIM to the user. The system reduces training needs for end users/dealers. An automatic process for adding access points (e.g., card readers) is created via the BIM area specification. Any new device that is added with a similar name can be automatically mapped into a corresponding area in the BIM. It can be extended to other types of security systems (e.g., video, intrusion, HVAC, BMS, FAS, etc.).

In general, the system includes a building information model (BIM) defined by a set of geographic coordinates of a secured area embodied in a memory, a plurality of security devices located within the secured area where each of the plurality of security devices has a short range wireless transceiver, a portable user device having a wireless transceiver, a global positioning system (GPS) and a programmed processor that interrogates the short range wireless transceiver of each of the plurality of security devices for identification and functional information of the security device as a user of the portable user device traverses the secured area and saves the identification and functional information along with geographic coordinates of each of the plurality of security devices under the BIM into a memory.

Alternatively, the system includes a security system that secures a predetermined geographic area, a building information model (BIM) defined by a set of geographic coordinates of the secured area embodied in a memory, a plurality of security devices located within the secured area where each of the plurality of security devices has a short range wireless transceiver and at least one of the plurality of security devices is a control panel of the security system and a portable user device having a wireless transceiver, a global positioning system (GPS) and a programmed processor that interrogates the short range wireless transceiver of each of the plurality of security devices for identification and functional information of the security device as a user of the portable user device traverses the secured area and saves the identification and functional information along with geographic coordinates of each of the plurality of security devices into a memory.

The system may also include a security system that secures a predetermined geographic area, a building information model (BIM) defined by a map of the secured geographic area embodied in a memory, a plurality of security devices located within the secured area where each of the plurality of security devices has a short range wireless transceiver and at least one of the plurality of security devices is a control panel of the security system, a portable user device having a wireless transceiver, a global positioning system (GPS) and a programmed processor, the programmed processor detects each of the plurality of security devices as a user of the portable user device traverses the secured area and interrogates the short range wireless transceiver of the security device for identification and functional information via the wireless transceiver, the programmable processor also detects a geographic location of the security device via the GPS and a processor that incorporates each of the plurality of security devices into the map of the security system based upon the geographic location of the security device.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:

1. An apparatus comprising: a building information model (BIM) defined by a set of geographic coordinates of a secured area embodied in a memory;
   a security system that protects the secured area, the security system including a control panel:
   a plurality of security devices located within the secured area, wherein each of the plurality of security devices includes a respective short range wireless transceiver, and wherein each of the plurality of security devices is wirelessly connected to the control panel using a respective wireless transceiver; and
   a portable user device that includes a portable device wireless transceiver, a global positioning system (GPS), and a programmed processor that interrogates the respective short range wireless transceiver of each of the plurality of security devices for identification and functional information of a respective security device as a user of the portable user device traverses the secured area and that saves the identification and functional information with first geographic coordinates of each of the plurality of security devices under the BIM in the memory, the first geographic coordinates determined using the GPS, wherein the programmed processor of the portable user device transfers the identification and functional information and the first geographic coordinates of each of the plurality of security devices under the BIM to the control panel of the security system, and wherein, after transferring the identification and functional information and the first geographic coordinates of each of the plurality of security devices to the control panel, the programmed processor of the portable user device sends a message to each of the plurality of security devices to activate each of the plurality of security devices as the portable user device re-interrogates the respective short range wireless transceiver of each of the plurality of security devices.

2. The apparatus as in claim 1 wherein the short range wireless transceivers further comprise Bluetooth Low Energy devices.

3. The apparatus as in claim 1 further comprising an input of the portable wireless device that receives an input from a user of the portable user device correlating the first geographic coordinates of one of the plurality of security devices with a geographic coordinate of the BIM.

4. The apparatus as in claim 1 wherein the BIM further comprises a textual name for each geographical area defined by the BIM.

5. The apparatus as in claim 4 further comprising a processor of the portable user device or control panel assigning a textual name to at least some of the plurality of security devices based upon the corresponding name of that area under the BIM.

6. The apparatus as in claim 1 wherein the BIM further comprising a map of the secured area.

7. The apparatus as in claim 6 further comprising a processor that incorporates an indicator of each of the plurality of security devices into the map by correlating the first geographical coordinates of each of the plurality of security devices with the geographic coordinates of the BIM.

8. The apparatus of claim 1, wherein the control panel confirms that the control panel received a signal from each activated security device of the plurality of security devices.

9. The apparatus of claim 1, wherein a location processor of the control panel receives second geographic coordinates from the portable user device each time the portable user device re-interrogates the respective short range wireless transceiver of each of the plurality of security devices.

10. The apparatus of claim 9, wherein the location processor of the control panel compares the second geographic coordinates to the first geographic coordinates to confirm that the first geographic coordinates match the second geographic coordinates.

11. An apparatus comprising:
a security system that secures a predetermined geographic area, wherein the security system includes a control panel;
a building information model (BIM) defined by a set of geographic coordinates of the secured area embodied in a memory;

a plurality of security devices located within the secured area wherein each of the plurality of security devices includes respective short range wireless transceiver, and wherein at least one of the plurality of security devices is the control panel of the security system, and wherein each of the plurality of security devices is wirelessly connected to the control panel using a respective wireless transceiver; and a portable user device that includes a portable device wireless transceiver, a global positioning system (GPS), and a programmed processor that interrogates the respective short range wireless transceiver of each of the plurality of security devices for identification and functional information of a respective security device as a user of the portable user device traverses the secured area and saves that the identification and functional information under the BIM with geographic coordinates of each of the plurality of security devices into the memory, the geographic coordinates determined using the GPS wherein the programmed processor of the portable user device transfers the identification and functional information and the geographic coordinates of each of the plurality of security devices under the BIM to the control panel of the security system, and wherein, after transferring the identification and functional information and the geographic coordinates of each of the plurality of security devices to the control panel, the programmed processor of the portable user device sends a message to each of the plurality of security devices to activate each of the plurality of security devices as the portable user device re-interrogates the respective short range wireless transceiver of each of the plurality of security devices a second time.

12. The apparatus as in claim 11 further comprising a processor that correlates the geographic location of at least one of the plurality of security devices with a corresponding geographic location of the BIM based upon an input from a user.

13. The apparatus as in claim 11 wherein at least some of the plurality of security devices further comprises a wireless transceiver for communicating with other members of the plurality of security devices that is separate from the short range transceiver of the device.

14. The apparatus as in claim 11 wherein the short range wireless transceivers further comprise Bluetooth Low Energy devices.

15. The apparatus as in claim 14 wherein the short range wireless transceiver further comprise an RFID tag.

16. The apparatus as in claim 11 wherein the BIM further comprises a map of the secured area.

17. The apparatus as in claim 16 further comprising a processor that incorporates an indicator of each of the plurality of security devices into the map by correlating the geographical coordinates of each of the plurality of security devices with the geographic coordinates of the BIM.

18. The apparatus as in claim 17 further comprising a processor that assigns a textual name to each of the plurality of security devices based upon the function information and location within the BIM.

19. An apparatus comprising: a security system that secures a predetermined geographic area;
a building information model (BIM) defined by a map of the predetermined geographic area and embodied in a memory;
a plurality of security devices located within the predetermined geographic area, wherein each of the plurality of security devices includes a respective short range wireless transceiver, wherein at least one of the plurality of security devices is a control panel of the security system, and wherein each of the plurality of security devices is wirelessly connected to the control panel using a respective wireless transceiver;

a portable user device that includes a portable device wireless transceiver, a global positioning system (GPS), and a programmed processor, wherein the programmed processor detects each of the plurality of security devices as a user of the portable user device traverses the predetermined geographic area and interrogates the respective short range wireless transceiver of each of the plurality of security devices for identification and functional information via the portable device wireless transceiver, the programmed processor also detects a geographic location of each of the plurality of security devices via the GPS; and wherein the programmed processor of the portable user device transfers the identification and functional information and the first geographic coordinates of each of the plurality of security devices under the BIM to the control panel of the security system, and a processor that incorporates each of the plurality of security devices into the map based upon the geographic location of each of the plurality of security devices, wherein, after transferring the identification and functional information and the first geographic coordinates of each of the plurality of security devices to the control panel, the programmed processor of the portable user device sends a message to each of the plurality of security devices to activate each of the plurality of security devices as the portable user device re-interrogates the respective short range wireless transceiver of each of the plurality of security devices.

* * * * *